(12) United States Patent
Nishimoto et al.

(10) Patent No.: US 11,268,195 B2
(45) Date of Patent: Mar. 8, 2022

(54) AUSTENITIC HEAT RESISTANT ALLOY AND METHOD FOR PRODUCING THE SAME

(71) Applicant: NIPPON STEEL CORPORATION, Tokyo (JP)

(72) Inventors: Takumi Nishimoto, Tokyo (JP); Yoshitaka Nishiyama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/958,003

(22) PCT Filed: Jan. 8, 2019

(86) PCT No.: PCT/JP2019/000163
§ 371 (c)(1),
(2) Date: Jun. 25, 2020

(87) PCT Pub. No.: WO2019/138986
PCT Pub. Date: Jul. 18, 2019

(65) Prior Publication Data
US 2021/0062345 A1  Mar. 4, 2021

(30) Foreign Application Priority Data
Jan. 10, 2018  (JP) .............................. JP2018-001710

(51) Int. Cl.
*C23C 22/34* (2006.01)
*B32B 15/01* (2006.01)
(Continued)

(52) U.S. Cl.
CPC ............ *C23C 22/34* (2013.01); *B32B 15/011* (2013.01); *C22C 38/001* (2013.01);
(Continued)

(58) Field of Classification Search
CPC ..... C23C 22/34; B32B 15/011; C22C 38/001; C22C 38/002; C22C 38/02; C22C 38/04;
(Continued)

(56) References Cited

FOREIGN PATENT DOCUMENTS

EP  2781612 A1  9/2014
JP  64068449 A  3/1989
(Continued)

OTHER PUBLICATIONS

Hirata et al., JP-2001107196-A machine translation, Apr. 17, 2001, entire machine translation (Year: 2001).*

(Continued)

*Primary Examiner* — Humera N. Sheikh
*Assistant Examiner* — Katherine A Christy
(74) *Attorney, Agent, or Firm* — Greer, Burns & Crain, Ltd.

(57) ABSTRACT

Provided is an austenitic heat resistant alloy capable of exhibiting sufficient molten-salt corrosion resistance even when exposed to a molten salt of 600° C., and a production method thereof. The austenitic heat resistant alloy includes a base metal and a Fe—Cr—Ni—W film on the surface of the base metal. The base metal has a chemical composition consisting of: C: 0.030 to 0.120%, Si: 0.02 to 1.00%, Mn: 0.10 to 2.00%, Cr: 20.0% or more to less than 28.0%, Ni: more than 35.0% to 50.0% or less, W: 4.0 to 10.0%, Ti: 0.01 to 0.30%, Nb: 0.01 to 1.00%, sol. Al: 0.0005 to 0.0400%, and B: 0.0005 to 0.0100%, with the balance being Fe and impurities. The Fe—Cr—Ni—W film contains, as oxides, Fe: 15.0 to 35.0 at %, Cr: 15.0 to 35.0 at %, Ni: 10.0 to 45.0 at %, and W: 0.5 to 16.5 at %.

9 Claims, 2 Drawing Sheets

(51) Int. Cl.
*C22C 38/00* (2006.01)
*C22C 38/02* (2006.01)
*C22C 38/04* (2006.01)
*C22C 38/06* (2006.01)
*C22C 38/44* (2006.01)
*C22C 38/48* (2006.01)
*C22C 38/50* (2006.01)
*C22C 38/54* (2006.01)
*C22C 38/58* (2006.01)
*C22C 38/52* (2006.01)

(52) U.S. Cl.
CPC .......... *C22C 38/002* (2013.01); *C22C 38/005* (2013.01); *C22C 38/02* (2013.01); *C22C 38/04* (2013.01); *C22C 38/06* (2013.01); *C22C 38/44* (2013.01); *C22C 38/48* (2013.01); *C22C 38/50* (2013.01); *C22C 38/52* (2013.01); *C22C 38/54* (2013.01); *C22C 38/58* (2013.01)

(58) Field of Classification Search
CPC ......... C22C 38/06; C22C 38/44; C22C 38/48; C22C 38/50; C22C 38/54; C22C 38/58
USPC .......................................................... 428/682
See application file for complete search history.

(56) References Cited

FOREIGN PATENT DOCUMENTS

| JP | 08041595 A | | 2/1996 |
|---|---|---|---|
| JP | 2001107196 A | * | 4/2001 |
| JP | 2001107196 A | | 4/2001 |
| JP | 2013104109 A | | 5/2013 |
| JP | 2013199663 A | | 10/2013 |
| JP | 2016050328 A | | 4/2016 |

OTHER PUBLICATIONS

ISR issued in Int'l. Application No. PCT/JP2019/000163, dated Feb. 19, 2019.

* cited by examiner

AUSTENITIC HEAT RESISTANT ALLOY AND METHOD FOR PRODUCING THE SAME

This is a National Phase Application filed under 35 U.S.C. § 371, of International Application No. PCT/JP2019/000163, filed Jan. 8, 2019, the contents of which are incorporated by reference.

TECHNICAL FIELD

The present disclosure relates to an austenitic heat resistant alloy and a production method thereof.

BACKGROUND ART

Recently, for the purpose of energy saving, the development of high efficiency boilers has been underway. For example, an ultra-supercritical boiler utilizes increased temperature and pressure of the steam than before for increased energy efficiency. For example, as a heat resistant alloy pipe for high-efficiency boilers, a seamless austenitic heat-resistant alloy pipe according to Japanese Patent Application Publication No. 2013-104109 (Patent Literature 1) is proposed. Further, boilers which utilize waste matter and biomass as a fuel other than fossil fuel have being developed. In addition, power generation boilers utilizing solar heat have been developed. In particular, solar power generation boilers have gained attention from the viewpoint of energy saving and environmental preservation.

In concentrating solar power generation which is common as solar power generation, sunlight is concentrated and converted to heat. Steam is generated by the heat obtained by converting sunlight, and a turbine is rotated by the steam to generate power. A configuration of a concentrating solar power generation system can be broadly divided into a light concentration/heat collection apparatus and a power generation apparatus. Examples of currently used light concentration/heat collection apparatus include a parabolic trough type, a linear Fresnel type, a tower type, and a dish type.

Heat medium such as oil has been used in a heat-transfer pipe of a conventional power generation boiler. However, as the efficiency and temperature thereof increase in recent years, a light concentration/heat collection apparatus for solar power generation may use a molten salt, such as a molten nitrate salt, molten carbonate salt, molten sulfate salt, and molten chloride salt as the heating medium.

Moreover, the temperature inside a heat-transfer pipe, etc., of the light concentration/heat collection apparatus for solar power generation rises to about 600° C. Therefore, a heat resistant steel to be used for the heat-transfer pipe, etc., of the light concentration/heat collection apparatus for solar power generation is required to have corrosion resistance in a high-temperature molten salt, in addition to high-temperature strength.

Japanese Patent Application Publication No. 2013-199663 (Patent Literature 2) proposes an austenitic stainless steel having excellent molten nitrate corrosion resistance, comprising, in mass %. C: 0.1% or less, Si: 0.3% or more to 2.0% or less, Mn: 4.0% or less, Ni: 7% or more to 15% or less, Cr: 10% or more to 25% or less, Mo: 2.5% or less, Cu: 3.0% or less, V: 0.5% or less, and N: 0.3% or less, while satisfying 0.5≤Si+0.5 (Mo+Cu)≤2.0%, with the balance being Fe and unavoidable impurities, wherein a proportion of elements other than oxygen that constitute oxides formed in a portion in contact with molten nitrate salt of not more than 600° C. satisfies, in atomic %, Si+0.5 (Mo+Cu)≤20%. Patent Literature 2 states that as a result of this, an austenitic stainless steel which is suitable for use in an area to be in contact with molten nitrate salt in a temperature range of 400 to 600° C. can be obtained.

Japanese Patent Application Publication No. 1-68449 (Patent Literature 3) proposes a molten-salt corrosion resistant material made of an alloy containing Fe, Cr, and Ni, wherein supposing the compositions of Fe, Cr, and Ni, expressed in weight % being as $C_{Fe}$, $C_{Cr}$, and $C_{Ni}$, a value of K defined as $K=C_{Fe} \times C_{Cr}+0.2 \times C_{Ni}^2$ is in a range of 1400 to 1800. Patent Literature 3 states that as a result of this, a molten-salt corrosion resistant material made of an alloy which spontaneously forms a film of Li-complex oxide having excellent corrosion resistance and becomes self-passivated under operating conditions of a molten-carbonate type fuel cell.

Japanese Patent Application Publication No. 8-41595 (Patent Literature 4) proposes a Fe—Cr—Ni based alloy steel having excellent corrosion resistance in a molten salt containing chloride, the Fe—Cr—Ni based alloy steel comprising: in weight %, C: 0.04% or less, Si: 0.5% or less, Mn: 1.5% or less, Cr: more than 18% to less than 30%, Ni: more than 10% to less than 35%, and Ca+Mg: 0.0005 to 0.005%, wherein a ratio of the Cr content to the Fe content (Cr/Fe) is more than 0.33 to less than 0.7, and a ratio of the Ni content to the Fe content (Ni/Fe) is more than 0.33 to less than 1.0. Patent Literature 4 states that as a result of this, a Fe—Cr—Ni based alloy steel having a low price and excellent corrosion resistance in a molten salt containing chloride can be provided.

Japanese Patent Application Publication No. 2016-50328 (Patent Literature 5) proposes a tube member for solar heat collection tube of a solar heat collection tube for heating a heat medium by collecting solar heat into the heat medium flowing inside, the tube member for solar heat collection tube being produced by centrifugal casting; consisting of basic elements consisting of carbon (C), silicon (Si), chromium (Cr), nickel (Ni), manganese (Mn) and copper (Cu), with the balance being iron (Fe) and unavoidable impurities, and trace modifying elements of not more than 1 mass % when the whole cast iron is 100 mass %; and being structured by a matrix composed of an Fe alloy having an austenite phase as the main phase in a room temperature range, wherein a high-nickel layer is formed on an inner surface of a tubular main body formed of a low-nickel heat resistant cast iron including 7 to 22 mass % of nickel (Ni) when the whole cast iron is 100 mass %. Patent Literature 5 states that as a result of this, when a molten salt is used as a heat medium, it is possible to provide a tube member for solar heat collection tube capable of preventing corrosion even when the molten salt becomes a high-temperature state more than 600° C.

CITATION LIST

Patent Literature

Patent Literature 1: Japanese Patent Application Publication No. 2013-104109
Patent Literature 2: Japanese Patent Application Publication No. 2013-199663
Patent Literature 3: Japanese Patent Application Publication No. 1-68449
Patent Literature 4: Japanese Patent Application Publication No. 8-41595

Patent Literature 5: Japanese Patent Application Publication No. 2016-50328

SUMMARY OF INVENTION

Technical Problem

However, even with use of the above described techniques, there are cases where sufficient corrosion resistance when exposed to a molten salt of 600° C. (hereinafter, referred to as molten-salt corrosion resistance) cannot be obtained.

It is an object of the present disclosure to provide an austenitic heat resistant alloy capable of exhibiting sufficient molten-salt corrosion resistance even when exposed to a molten salt of 600° C., and a production method thereof.

Solution to Problem

An austenitic heat resistant alloy of the present disclosure includes a base metal, and an Fe—Cr—Ni—W film on a surface of the base metal. The base metal has a chemical composition consisting of: in mass %, C: 0.030 to 0.120%, Si: 0.02 to 1.00%, Mn: 0.10 to 2.00%, Cr: 20.0% or more to less than 28.0%, Ni: more than 35.0% to 50.0% or less, W: 4.0 to 10.0%, Ti: 0.01 to 0.30%, Nb: 0.01 to 1.00%, sol. Al: 0.0005 to 0.0400%, B: 0.0005 to 0.0100%, Zr: 0 to 0.1000%, Ca: 0 to 0.0500%, REM: 0 to 0.2000%, Hf: 0 to 0.2000%, Pd: 0 to 0.2000%, P: 0.040% or less, S: 0.010% or less, N: less than 0.020%, O: 0.0050% or less, Mo: less than 0.5%, Co: 0 to 0.80%, and Cu: 0 to 0.50%, with the balance being Fe and impurities. The Fe—Cr—Ni—W film contains, as oxides, Fe: 15.0 to 35.0 at %, Cr: 15.0 to 35.0 at %, Ni: 10.0 to 45.0 at %, and W: 0.5 to 16.5 at %.

A method for producing an austenitic heat resistant alloy of the present disclosure includes a preparation step and an Fe—Cr—Ni—W film forming step. In the preparation step, a starting material having the above described chemical composition of the base metal of the austenitic heat resistant alloy is prepared. In the Fe—Cr—Ni—W film forming step, an Fe—Cr—Ni—W film is formed on a surface of the starting material by immersing the starting material in a solution which has a hydrofluoric acid concentration satisfying Formula (1) and a nitric acid concentration satisfying Formula (2):

$$35.6 \leq \text{hydrofluoric acid concentration(mass \%)} + (0.15Ni + 0.85Cr + 0.18Fe + 0.23W) \leq 37.7 \quad (1), \text{ and}$$

$$23.5 \leq \text{nitric acid concentration(mass \%)} + (0.25Ni + 0.31Cr - 0.18Fe + 0.24W) \leq 26.5 \quad (2),$$

where each element symbol in Formulae (1) and (2) is substituted by the content (mass %) of each element.

Advantageous Effects of Invention

The austenitic heat resistant alloy of the present disclosure has sufficient molten-salt corrosion resistance, even when exposed to a molten salt of 600° C. Moreover, the austenitic heat resistant alloy of the present disclosure is obtained by, for example, the production method of the present disclosure.

DESCRIPTION OF EMBODIMENTS

The present inventors have conducted studies to improve a molten-salt corrosion resistance of an austenitic heat resistant alloy. As a result, the present inventors have found the following findings.

Conventionally, in order to increase the corrosion resistance of a heat resistant steel, a Cr oxide film mainly composed of $Cr_2O_3$ has been formed on the surface of a heat resistant steel. This enables to suppress outward diffusion of the components of the heat resistant steel, thereby improving the corrosion resistance of the heat resistant steel. However, $Cr_2O_3$ is active against a molten salt such as molten nitrate salt. For that reason, the Cr oxide film will dissolve in the molten salt as chromate ions. Therefore, it is difficult to improve the molten-salt corrosion resistance of an austenitic heat resistant alloy by the method of forming a Cr oxide film as in conventional methods.

On the other hand, for example, when a film mainly composed of Fe oxide is formed on the surface of the base metal of an austenitic heat resistant alloy, the growth rate of Fe oxide is significantly faster. Furthermore, since the Fe oxide cannot suppress inward diffusion of oxygen from the molten salt, it is difficult to improve the molten-salt corrosion resistance of an austenitic heat resistant alloy by the film mainly composed of Fe oxide.

On the other hand, for example, when a film mainly composed of Ni oxide is formed on the surface of the base metal, the growth rate of the Ni oxide is significantly slow. Therefore, it is difficult to obtain a film of sufficient thickness. In this case, it is not possible to suppress contact between the base metal and the molten salt. As a result, elements such as Cr, W, and Mo, which are active against the molten salt, dissolve, and corrosion progresses. Further, even when thick Ni oxide containing NiO is formed, it is not possible to suppress inward diffusion of oxygen, Na, and K, etc., from the molten salt. Therefore, even with a film mainly composed of Ni oxide, it is difficult to improve the molten-salt corrosion resistance of an austenitic heat resistant alloy.

FIGS. 1 to 4 are diagrams showing relationships between the composition of the film on the surface of an austenitic heat resistant alloy, and the corrosion weight loss of the austenitic heat resistant alloy in a molten salt.

Figure 1:
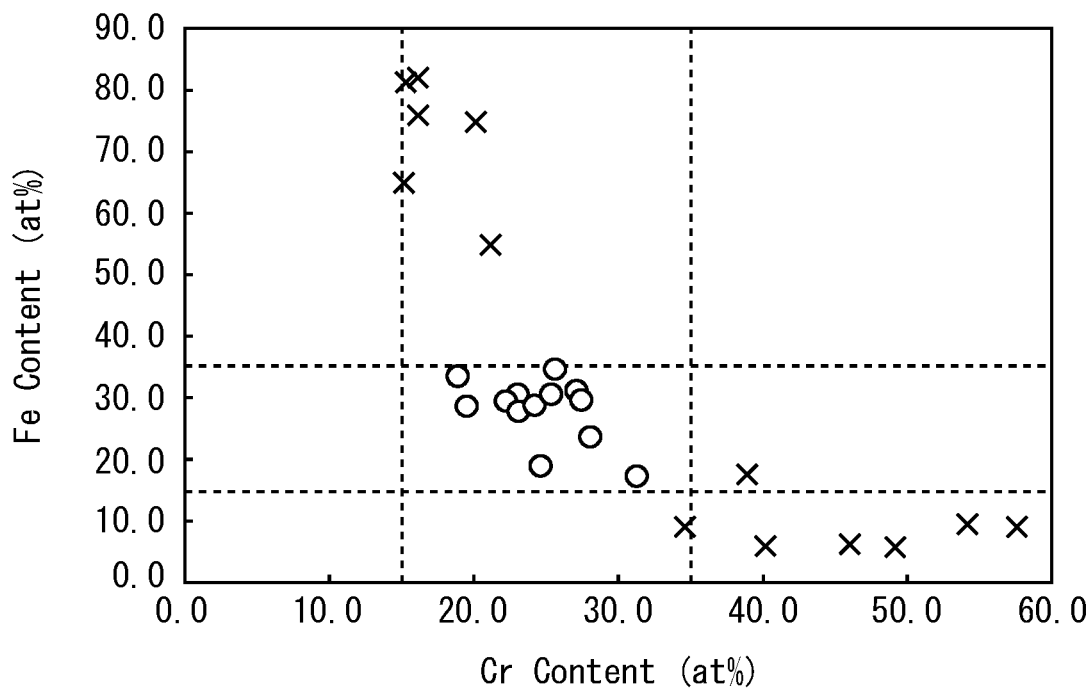
FIG. 1 illustrates a relationship between the Fe content and the Cr content of an Fe—Cr—Ni—W film on the surface of an austenitic heat resistant alloy, and a corrosion weight loss of the austenitic heat resistant alloy in a molten salt.

FIG. 1 illustrates a relationship between the Fe content and the Cr content of an Fe—Cr—Ni—W film on the surface of an austenitic heat resistant alloy, and the corrosion weight loss of the austenitic heat resistant alloy in a molten salt. FIG. 1 was obtained from Examples to be described below. The ordinate of FIG. 1 shows the Fe content (at %) as an oxide of an Fe—Cr—Ni—W film on the surface of an austenitic heat resistant alloy. The abscissa of FIG. 1 shows the Cr content (at %) as an oxide of the Fe—Cr—Ni—W film on the surface of an austenitic heat resistant alloy. Each of white circles (○) in FIG. 1 indicates an Example in which the corrosion weight loss in a molten salt corrosion test is not more than 10.0 mg/cm$^2$. Each of cross marks (x) in FIG. 1 indicates a Comparative Example in which the corrosion weight loss in the molten salt corrosion test is more than 10.0 mg/cm$^2$. Referring to FIG. 1, if an Fe—Cr—Ni—W film on the surface of an austenitic heat resistant alloy contains, Fe: 15.0 to 35.0 at % as an oxide and Cr: 15.0 to 35.0 at % as an oxide, excellent molten-salt corrosion resistance will be obtained.

Figure 2:
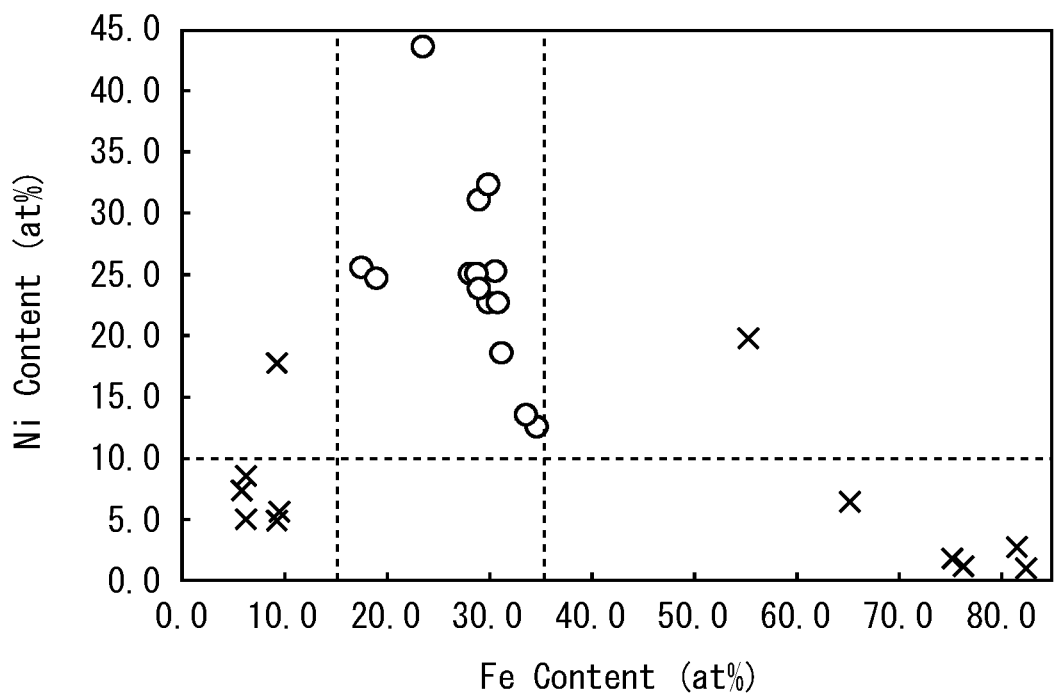
FIG. 2 illustrates a relationship between the Ni content and the Fe content of the Fe—Cr—Ni—W film on the surface of an austenitic heat resistant alloy, and a corrosion weight loss of the austenitic heat resistant alloy in a molten salt.

FIG. 2 illustrates a relationship between the Ni content and the Fe content of an Fe—Cr—Ni—W film on the surface of an austenitic heat resistant alloy, and the corrosion weight loss of the austenitic heat resistant alloy in a molten salt. FIG. 2 was obtained from Examples to be described below. The ordinate of FIG. 2 shows the Ni content (at %) as an oxide of an Fe—Cr—Ni—W film on the surface of an austenitic heat resistant alloy. The abscissa of FIG. 2 shows the Fe content (at %) as an oxide of an Fe—Cr—Ni—W film on the surface of an austenitic heat resistant alloy. Each of white circles (○) in FIG. 2 indicates an Example in which the corrosion weight loss in a molten salt corrosion test is not more than 10.0 mg/cm$^2$. Each of cross marks (x) in FIG. 2 indicates a Comparative Example in which the corrosion weight loss in the molten salt corrosion test is more than 10.0 mg/cm$^2$. Referring to FIG. 2, if an Fe—Cr—Ni—W film on the surface of an austenitic heat resistant alloy contains Fe: 15.0 to 35.0 at % as an oxide and Ni: 10.0 to 45.0 at % as an oxide, excellent molten-salt corrosion resistance will be obtained.

Figure 3:
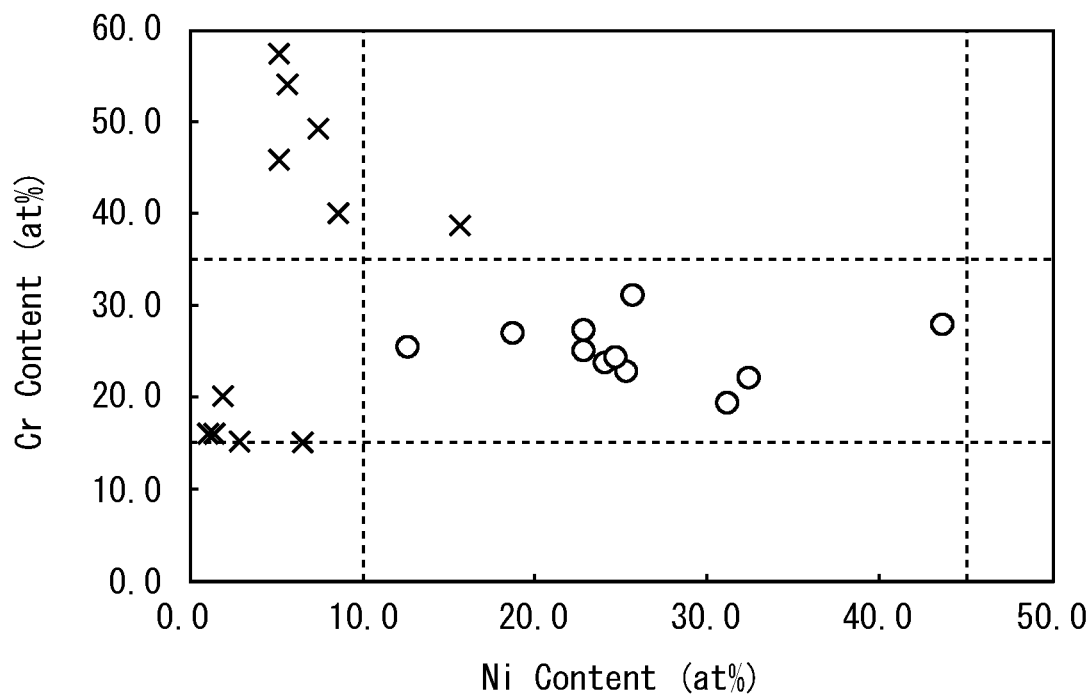
FIG. 3 illustrates a relationship between the Cr content and the Ni content of the Fe—Cr—Ni—W film on the surface of an austenitic heat resistant alloy, and a corrosion weight loss of the austenitic heat resistant alloy in a molten salt.

FIG. 3 illustrates a relationship between the Cr content and the Ni content of an Fe—Cr—Ni—W film on the surface of an austenitic heat resistant alloy, and the corrosion weight loss of the austenitic heat resistant alloy in a molten salt. FIG. 3 was obtained from Examples to be described below. The ordinate of FIG. 3 shows the Cr content (at %) as an oxide of an Fe—Cr—Ni—W film on the surface of an austenitic heat resistant alloy. The abscissa of FIG. 3 shows the Ni content (at %) as an oxide of an Fe—Cr—Ni—W film on the surface of an austenitic heat resistant alloy. Each of white circles (○) in FIG. 3 indicates an Example in which the corrosion weight loss in a molten salt corrosion test is not more than 10.0 mg/cm. Each of cross marks (x) in FIG. 3 indicates a Comparative Example in which the corrosion weight loss in the molten salt corrosion test is more than 10.0 mg/cm. Referring to FIG. 3, if an Fe—Cr—Ni—W film on the surface of an austenitic heat resistant alloy contains Ni: 10.0 to 45.0 at % as an oxide and Cr: 15.0 to 35.0 at % as an oxide, excellent molten-salt corrosion resistance will be obtained.

Figure 4:
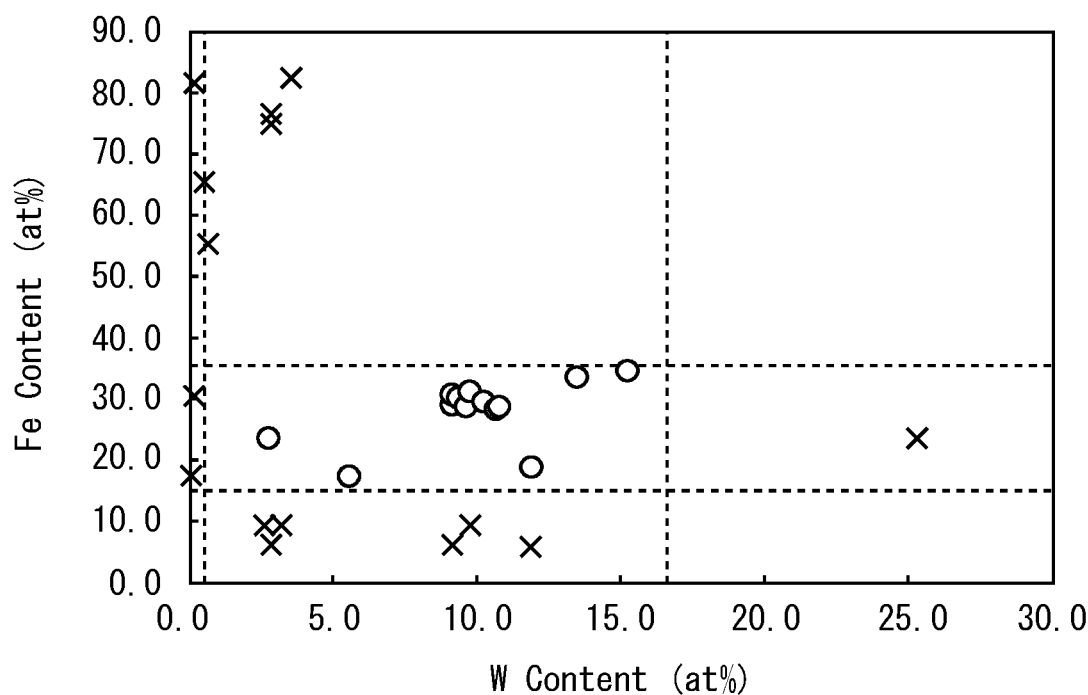
FIG. 4 illustrates a relationship between the Fe content and the W content of the Fe—Cr—Ni—W film on the surface of an austenitic heat resistant alloy, and a corrosion weight loss of the austenitic heat resistant alloy in a molten salt.

FIG. 4 illustrates a relationship between the Fe content and the W content of an Fe—Cr—Ni—W film on the surface of an austenitic heat resistant alloy, and the corrosion weight loss of the austenitic heat resistant alloy in a molten salt. FIG. 4 was obtained from Examples to be described below. The ordinate of FIG. 4 shows the Fe content (at %) as an oxide of an Fe—Cr—Ni—W film on the surface of an austenitic heat resistant alloy. The abscissa of FIG. 4 shows the W content (at %) as an oxide of an Fe—Cr—Ni—W film on the surface of an austenitic heat resistant alloy. Each of white circles (○) in FIG. 4 indicates an Example in which the corrosion weight loss in a molten salt corrosion test is not more than 10.0 mg/cm. Each of cross marks (x) in FIG. 4 indicates a Comparative Example in which the corrosion weight loss in the molten salt corrosion test is more than 10.0 mg/cm. Referring to FIG. 4, if an Fe—Cr—Ni—W film on the surface of an austenitic heat resistant alloy contains Fe: 15.0 to 35.0 at % as an oxide and W: 0.5 to 16.5 at % as an oxide, excellent molten-salt corrosion resistance will be obtained.

From what has been described so far, the present inventors have found that, if the Fe—Cr—Ni—W film contains Fe: 15.0 to 35.0 at %, Cr: 15.0 to 35.0 at %, Ni: 10.0 to 45.0 at %, and W: 0.5 to 16.5 at %, it is possible to improve the molten-salt corrosion resistance of an austenitic heat resistant alloy. The reason why the Fe—Cr—Ni—W film having this composition improves the molten-salt corrosion resistance of an austenitic heat resistant alloy is considered as follows. The Fe—Cr—Ni—W film is, in contrast to a conventional Cr oxide film, not likely to dissolve in the molten salt. For that reason, the Fe—Cr—Ni—W film suppresses contact between the molten salt and the base metal of a heat-resistant steel. Furthermore, the Fe—Cr—Ni—W film suppresses inward diffusion of components (Na ion or K ion, etc.) of the molten salt into the base metal. As a result, the Fe—Cr—Ni—W film suppresses corrosion of the base metal, thereby improving the molten-salt corrosion resistance of an austenitic heat resistant alloy.

An austenitic heat resistant alloy of the present disclosure, which has been completed based on the above findings, includes a base metal and an Fe—Cr—Ni—W film on the surface of the base metal. The base metal has a chemical composition consisting of: in mass %, C: 0.030 to 0.120%, Si: 0.02 to 1.00%, Mn: 0.10 to 2.00%, Cr: 20.0% or more to less than 28.0%, Ni: more than 35.0% to 50.0% or less, W: 4.0 to 10.0%, Ti: 0.01 to 0.30%, Nb: 0.01 to 1.00%, sol. Al: 0.0005 to 0.0400%, B: 0.0005 to 0.0100%. Zr: 0 to 0.1000%, Ca: 0 to 0.0500%, REM: 0 to 0.2000%, Hf: 0 to 0.2000%, Pd: 0 to 0.2000%, P: 0.040% or less, S: 0.010% or less, N: less than 0.020%, O: 0.0050% or less, Mo: less than 0.5%, Co: 0 to 0.80%, and Cu: 0 to 0.50%, with the balance being Fe and impurities. The Fe—Cr—Ni—W film contains, as oxides, Fe: 15.0 to 35.0 at %, Cr: 15.0 to 35.0 at %, Ni: 10.0 to 45.0 at %, and W: 0.5 to 16.5 at %.

An austenitic heat resistant alloy of the present disclosure includes an Fe—Cr—Ni—W film on the surface of the base metal. The Fe—Cr—Ni—W film contains, as oxides, Fe, Cr, Ni and W in an appropriate range. For that reason, the austenitic heat resistant alloy of the present disclosure has sufficient molten-salt corrosion resistance, even when exposed to a molten salt of 600° C.

Preferably, the chemical composition of the base metal contains, in mass %, Zr: 0.0005 to 0.1000%.

In this case, a high-temperature strength of the austenitic heat resistant alloy is improved.

Preferably, the chemical composition of the base metal contains, in mass %. Ca: 0.0005 to 0.0500%.

In this case, hot workability of the austenitic heat resistant alloy is improved.

Preferably, the chemical composition of the base metal contains at least one kind selected from the group consisting of, in mass %, REM: 0.0005 to 0.2000%, Hf: 0.0005 to 0.2000%, and Pd: 0.0005 to 0.2000%.

In this case, creep strength of the austenitic heat resistant alloy is improved.

A method for producing an austenitic heat resistant alloy of the present disclosure includes a preparation step and an Fe—Cr—Ni—W film forming step. In the preparation step, a starting material having the above described chemical composition is prepared. In the Fe—Cr—Ni—W film forming step, an Fe—Cr—Ni—W film is formed on a surface of the starting material by immersing the starting material in a solution having a hydrofluoric acid concentration satisfying Formula (1) and a nitric acid concentration satisfying Formula (2):

$$35.6 \leq \text{hydrofluoric acid concentration(mass \%)} + (0.15\text{Ni}+0.85\text{Cr}+0.18\text{Fe}+0.23\text{W}) \leq 37.7 \quad (1), \text{ and}$$

$$23.5 \leq \text{nitric acid concentration(mass \%)} + (0.25\text{Ni}+0.31\text{Cr}-0.18\text{Fe}+0.24\text{W}) \leq 26.5 \quad (2),$$

where each element symbol in Formulae (1) and (2) is substituted by the content (mass %) of each element.

Hereinafter, an austenitic heat resistant alloy of the present disclosure will be described in detail.

[Austenitic Heat Resistant Alloy]

An austenitic heat resistant alloy of the present disclosure includes a base metal, and an Fe—Cr—Ni—W film on the surface of the base metal.

[Chemical Composition of Base Metal]

The chemical composition of the base metal of an austenitic heat resistant alloy of the present disclosure contains the following elements. Unless otherwise stated, "%" regarding an element means "mass %".

C: 0.030 to 0.120%

Carbon (C) is a necessary element for forming carbides and thereby obtaining high-temperature tensile strength and high-temperature creep strength required as an austenitic heat resistant alloy for high temperatures around 600° C. This effect cannot be obtained if the C content is too low. On the other hand, if the C content is too high, undissolved carbides are generated. Further if the C content is too high, Cr carbide is excessively generated, thus deteriorating weldability of an austenitic heat resistant alloy. Therefore, the C content is 0.030 to 0.120%. A lower limit of the C content is preferably 0.040%, and more preferably 0.050%. An upper limit of the C content is preferably 0.110%, and more preferably 0.100%.

Si: 0.02 to 1.00%

Silicon (Si), which is added as a deoxidizer during steel making, is also a necessary element to improve the oxidation resistance of an austenitic heat resistant alloy. This effect cannot be obtained if the Si content is too low. On the other hand, if the Si content is too high, hot workability of an austenitic heat resistant alloy deteriorates. Therefore, the Si content is 0.02 to 1.00%. A lower limit of the Si content is preferably 0.05%, and more preferably 0.10%. An upper limit of the Si content is preferably 0.80%, and more preferably 0.50%.

Mn: 0.10 to 2.00%

Manganese (Mn) combines with S, which is an impurity contained in an austenitic heat resistant alloy, to form an MnS, thereby improving hot workability. This effect cannot be obtained if the Mn content is too low. On the other hand, if the Mn content is too high, an austenitic heat resistant alloy is embrittled, rather deteriorating hot workability. Further if the Mn content is too high, weldability of the austenitic heat resistant alloy deteriorates. Therefore, the Mn content is 0.10 to 2.00%. A lower limit of the Mn content is preferably 0.20%, more preferably 0.30%, and further preferably 0.50%. An upper limit of the Mn content is preferably 1.80%, more preferably 1.50%, and further preferably 1.20%.

Cr: 20.0% or More to Less than 28.0%

Chromium (Cr) is an important element for improving molten-salt corrosion resistance. Further, Cr improves the oxidation resistance of an austenitic heat resistant alloy. To ensure excellent molten-salt corrosion resistance in a molten salt of 400 to 600° C., a Cr content of not less than 20.0% is required. Conventionally, it is generally considered that corrosion resistance improves as the Cr content increases. However, if the Cr content is too high, a Cr oxide film mainly composed of Cr oxide is formed. Since the Cr oxide film dissolves into a molten salt, the molten-salt corrosion resistance of an austenitic heat resistant alloy deteriorates. Further, if the Cr content is too high, structural stability deteriorates, and creep strength of the austenitic heat resistant alloy decreases. Furthermore, if the Cr content is too high, weldability of the austenitic heat resistant alloy deteriorates. Therefore, the Cr content is 20.0% or more to less than 28.0%. A lower limit of the Cr content is preferably 20.5%, more preferably 21.0%, and further preferably 22.0%. An upper limit of the Cr content is preferably 27.5%, more preferably 26.5%, and further preferably 26.0%.

Ni: More than 35.0% to 50.0% or Less

Nickel (Ni) is an element that stabilizes an austenitic structure, and is an important alloying element to ensure molten-salt corrosion resistance. To obtain a stable austenitic structure, a Ni content of more than 35.0% is required from the balance between itself and the Cr content described above. On the other hand, if the Ni content is too high, since an Fe—Cr—Ni—W film will not be formed in a stable manner, Cr oxide or Ni oxide will be formed. In this case, the molten-salt corrosion resistance of an austenitic heat resistant alloy in a molten salt deteriorates. Further, if the Ni content is too high, increase in cost will result. Further, if the Ni content is too high, creep strength of an austenitic heat resistant alloy decreases. Therefore, the Ni content is more than 35.0% to 50.0% or less. A lower limit of the Ni content is preferably 38.5%, more preferably 40.0%, and further preferably 41.0%. An upper limit of the Ni content is preferably 48.0%, more preferably 47.0%, and further preferably 45.0%.

W: 4.0 to 10.0%

Tungsten (W) suppresses grain sliding creep, which occurs preferentially in a high-temperature region, by solid-solution strengthening effect. If the W content is too low, this effect cannot be obtained. On the other hand, if the W content is too high, since an austenitic heat resistant alloy is excessively hardened, hot workability of the austenitic heat resistant alloy deteriorates. Further if the W content is too high, weldability of the austenitic heat resistant alloy deteriorates. Therefore, the W content is 4.0 to 10.0%. A lower limit of the W content is preferably 4.5%, and more preferably 6.0%. An upper limit of the W content is preferably 9.0%, and more preferably 8.0%.

Ti: 0.01 to 0.30%

Titanium (Ti) precipitates as a carbonitride, thereby increasing the high temperature strength of an austenitic heat resistant alloy. If the Ti content is too low, this effect cannot be obtained. On the other hand, if the Ti content is too high, undissolved carbonitride and/or oxide is generated, thus the austenite grain is caused to have a mixed grain size. Further if the Ti content is too high, nonuniform creep deformation and deterioration of ductility are caused. Therefore, the Ti content is 0.01 to 0.30%. A lower limit of the Ti content is preferably 0.03%, and more preferably 0.05%. An upper limit of the Ti content is preferably 0.25%, and more preferably 0.20%.

Nb: 0.01 to 1.00%

Niobium (Nb) precipitates as carbonitride to increase the high temperature strength of an austenitic heat resistant alloy. If the Nb content is too low, this effect cannot be obtained. On the other hand, if the Nb content is too high, weldability of an austenitic heat resistant alloy deteriorates. Therefore, the Nb content is 0.01 to 1.00%. A lower limit of the Nb content is preferably 0.05%, and more preferably 0.10%. An upper limit of the Nb content is preferably 0.60%, and more preferably 0.50%.

Sol. Al: 0.0005 to 0.0400%

Aluminum (Al) is used as a deoxidizer. If the Al content is too low, this effect cannot be obtained. On the other hand, if a large amount of Al remains, structural stability of an austenitic heat resistant alloy deteriorates. Therefore, the Al content is 0.0005 to 0.0400%. A lower limit of the Al content is preferably 0.0010%, and more preferably 0.0050%. An upper limit of the Al content is preferably 0.0300%, and more preferably 0.0200%. In the present disclosure, an Al content refers to the content of acid-soluble Al (sol. Al).

B: 0.0005 to 0.0100%

Boron (B) suppresses oxides or nitrides by reducing the contents of N and O to be described later. If the B content is too low, this effect cannot be obtained. On the other hand, if the B content is too high, weldability of an austenitic heat resistant alloy deteriorates. Therefore, the B content is 0.0005 to 0.0100%. A lower limit of the B content is preferably 0.0007%, and more preferably 0.0010%. An upper limit of the B content is preferably 0.0080%, and more preferably 0.0050%.

The balance of the chemical composition of the base metal of an austenitic heat resistant alloy of the present disclosure consists of Fe and impurities. Here, the term "impurities" in the chemical composition of the base metal means what are introduced from ores and scraps as raw materials, or a production environment when industrially producing an austenitic heat resistant alloy, and what are permitted within a range not adversely affecting the austenitic heat resistant alloy of the present disclosure.

[Optional Elements]

The chemical composition of the base metal of an austenitic heat resistant alloy of the present disclosure may contain the following elements as optional elements.

Zr: 0 to 0.1000%

Zirconium (Zr) is an optional element and may not be contained. In other words, the Zr content may be 0%. If contained, Zr strengthens grain boundaries, thereby improving high temperature strength of an austenitic heat resistant alloy. This effect will be obtained if even a slight amount of Zr is contained. On the other hand, if the Zr content is too high, undissolved oxide and nitride are generated, similarly to the case of Ti, thus promoting grain sliding creep and non-uniform creep deformation. Further, if the Zr content is too high, creep strength and ductility in a high-temperature region of an austenitic heat resistant alloy deteriorate. Therefore, the Zr content is 0 to 0.1000%. A lower limit of the Zr content is preferably 0.0005%, and more preferably 0.0010%. An upper limit of the Zr content is preferably 0.0600%.

Ca: 0 to 0.0500%

Calcium (Ca) is an optional element and may not be contained. In other words, the Ca content may be 0%. If contained, Ca combines with S thereby stabilizing S. and improves hot workability of an austenitic heat resistant alloy. This effect will be obtained if even a slight amount of Ca is contained. On the other hand, if the Ca content is too high, toughness, ductility and steel quality of an austenitic heat resistant alloy deteriorate. Therefore, the Ca content is 0 to 0.0500%. A lower limit of the Ca content is preferably 0.0005%. An upper limit of the Ca content is preferably 0.0100%.

REM: 0 to 0.2000%

Rare earth metals (REM) are optional elements and may not be contained. In other words, the REM content may be 0%. If contained, REM form stable oxides and sulfides, thereby suppressing undesirable effects of O and S. If REM are contained, corrosion resistance, hot workability, creep strength and creep ductility of an austenitic heat resistant alloy will be improved. These effects will be obtained if even a slight amount of REM is contained. On the other hand, if the REM content is too high, inclusions such as oxides are excessively generated, and thereby hot workability and weldability of an austenitic heat resistant alloy deteriorate. Therefore, the REM content is 0 to 0.2000%. A lower limit of the REM content is preferably 0.0005%, and more preferably 0.0010%. An upper limit of the REM content is preferably 0.1000%. The REM in the present disclosure means 17 elements including elements from Lanthanum (La) of element number 57 to Lutetium (Lu) of element number 71 in the periodic table, added with Yttrium (Y) and Scandium (Sc). The REM content means a total content of these elements.

Hf: 0 to 0.2000%

Hafnium (Hf) is an optional element and may not be contained. In other words, the Hf content may be 0%. If contained, Hf forms stable oxides and sulfides, thereby suppressing undesirable effects of O and S. If Hf is contained, corrosion resistance, hot workability, creep strength and creep ductility of an austenitic heat resistant alloy will be improved. These effect will be obtained if even a slight amount of Hf is contained. On the other hand, if the Hf content is too high, inclusions such as oxides are excessively generated, thereby deteriorating hot workability and weldability of an austenitic heat resistant alloy. Therefore, the Hf content is 0 to 0.2000%. A lower limit of the Hf content is preferably 0.0005%, and more preferably 0.0010%. An upper limit of the Hf content is preferably 0.1000%.

Pd: 0 to 0.2000%

Palladium (Pd) is an optional element and may not be contained. In other words, the Pd content may be 0%. If contained. Pd forms stable oxides and sulfides, thereby suppressing undesirable effects of O and S. If Pd is contained, corrosion resistance, hot workability, creep strength and creep ductility of an austenitic heat resistant alloy will be improved. These effects will be obtained if even a slight amount of Pd is contained. On the other hand, if the Pd content is too high, inclusions such as oxides are excessively generated, thereby deteriorating hot workability and weldability of an austenitic heat resistant alloy. Therefore, the Pd content is 0 to 0.2000%. A lower limit of the Pd content is preferably 0.0005%, and more preferably 0.0010%. An upper limit of the Pd content is preferably 0.1000%.

The impurities include, for example, the following elements. The contents of these elements are limited from the following reasons.

P: 0.040% or Less

Phosphorus (P) is an impurity which is unavoidably contained. In other words, a lower limit of the P content is more than 0%. P deteriorates weldability and hot workability of an austenitic heat resistant alloy. Therefore, the P content is 0.040% or less. An upper limit of the P content is preferably 0.030%. The P content is preferably as low as possible. However, extreme reduction of the P content will significantly increase the production cost. Therefore, when taking into consideration of industrial production, a lower limit of the P content is preferably 0.0005%.

S: 0.010% or Less

Sulfur (S) is an impurity which is unavoidably contained. In other words, a lower limit of the S content is more than 0%. S deteriorates weldability and hot workability of an austenitic heat resistant alloy. Therefore, the S content is 0.010% or less. An upper limit of the S content is preferably 0.008%. The S content is preferably as low as possible. However, in a case in which a slight amount of S is contained to increase the fluidity during welding, not less than 0.004% of S may be contained.

N: Less than 0.020%

Nitrogen (N) is an impurity which is unavoidably contained. In other words, a lower limit of the N content is more than 0%. If the N content is too high, undissolved carbonitrides of Ti and B are generated, thereby causing the structure of an austenitic heat resistant alloy to have a mixed grain size. In this case, grain sliding creep and non-uniform creep deformation in a high-temperature region is promoted, thereby decreasing strength of an austenitic heat resistant alloy. Therefore, the N content is less than 0.020%. An upper limit of the N content is preferably 0.016%, and more preferably 0.010%. The N content is preferably as low as possible. However, extreme reduction of the N content will significantly increase the production cost. Therefore, when taking into consideration of industrial production, a lower limit of the N content is preferably 0.005%.

O: 0.0050% or Less

Oxygen (O) is an impurity which is unavoidably contained. In other words, a lower limit of the O content is more than 0%. If the O content is too high, undissolved oxides of Ti and Al are generated, thereby causing the structure of an austenitic heat resistant alloy to have a mixed grain size. In this case, grain sliding creep and non-uniform creep deformation in a high-temperature region are promoted, thus decreasing strength of an austenitic heat resistant alloy. Therefore, the O content is 0.0050% or less. An upper limit of the O content is preferably 0.0030%. The O content is preferably as low as possible. However, extreme reduction of the O content will significantly increase the production cost. Therefore, when taking into consideration of industrial production, a lower limit of the O content is preferably 0.0005%.

Mo: Less than 0.5%

Molybdenum (Mo) is an impurity which is unavoidably contained. In other words, the lower limit of the Mo content is more than 0%. If the Mo content is too high, which causes an austenitic heat resistant alloy to produce an embrittled layer in a high-temperature environment. Further, if the Mo content is too high, corrosion resistance of an austenitic heat resistant alloy deteriorates. Therefore, the Mo content is less than 0.5%. An upper limit of the Mo content is preferably 0.3%, and more preferably 0.1%. The Mo content is preferably as low as possible. However, extreme reduction of the Mo content will significantly increase the production cost. Therefore, when taking into consideration of industrial production, a lower limit of the Mo content is preferably 0.01%.

Co: 0 to 0.80%

Cobalt (Co) is an impurity which may be mixed from scraps or the like. Co may not be contained. In other words, the Co content may be 0%. If the Co content is too high, hot workability of an austenitic heat resistant alloy deteriorates. Therefore, Co is not positively added. The Co content is 0 to 0.80%. If Co is contained, the lower limit of the Co content is more than 0%. However, in a case in which a slight amount of Co is contained to improve creep strength, not less than 0.01% of Co may be contained.

Cu: 0 to 0.50%

Copper (Cu) is an impurity which may be mixed from scraps or the like. Cu may not be contained. In other words, the Cu content may be 0%. If the Cu content is too high, grain sliding creep in a high-temperature region will be promoted. Therefore, Cu is not positively added. The Cu content is 0 to 0.5%. If Cu is contained, a lower limit of the Cu content is more than 0%. An upper limit of the Cu content is preferably 0.20%. However, in a case in which a slight amount of Cu is contained to increase strength, not less than 0.01% of Cu may be contained.

[Base Metal]

The microstructure of the base metal of an austenitic heat resistant alloy of the present disclosure is an austenite single phase, excepting precipitates. The shape of the austenitic heat resistant alloy of the present disclosure will not be particularly limited. The shape of the austenitic heat resistant alloy may be any of a tube, a plate, a rod, a wire, and shape steel. The austenitic heat resistant alloy can be suitably used as a tube.

[Fe—Cr—Ni—W Film]

An Fe—Cr—Ni—W film is formed on the surface of the base metal. By being provided with an Fe—Cr—Ni—W film on the surface of the base metal, an austenitic heat resistant alloy exhibits improved molten-salt corrosion resistance.

An Fe—Cr—Ni—W film contains, as oxides, Fe: 15.0 to 35.0 at %, Cr: 15.0 to 35.0 at %, Ni: 10.0 to 45.0 at %, and W: 0.5 to 16.5 at %. Here, the term "as oxides" refers to cationic ions which combine with oxygen and are present as oxides, when all cationic ions (all cationic ions including oxides and metals) contained in the Fe—Cr—Ni—W film are supposed to be 100%. In other words, the Fe—Cr—Ni—W film contains, as oxides, Fe: 15.0 to 35.0 at %, Cr: 15.0 to 35.0 at %, Ni: 10.0 to 45.0 at % and W: 0.5 to 16.5 at % in a cationic ion fraction in which all cationic ions including oxides and metals are supposed to be 100%.

The Fe—Cr—Ni—W film may further contain other elements (i.e., elements other than Fe, Cr, Ni and W). Other elements refer to those contained in the chemical composition of the base metal. The other elements are contained in the Fe—Cr—Ni—W film as oxides or metals. The other elements are, for example, one or more kinds selected from the group consisting of Al, Si, Ti, Mn, Nb, Mo and Cu. The Fe—Cr—Ni—W film may contain, as oxides, not more than 1 at % of the other elements in total. In other words, the Fe—Cr—Ni—W film consists of: oxides of Fe, Cr, Ni, W, and other elements; Fe, Cr, Ni, W, and other elements, which are existent as metals; and impurities. If the Fe—Cr—Ni—W film contains, as oxides, Fe, Cr, Ni and W in an appropriate range, the molten-salt corrosion resistance of an austenitic heat resistant alloy will be improved in a molten salt of 600° C.

When the Fe—Cr—Ni—W film contains, as oxides, Fe, Cr, Ni, and W in an appropriate range, the Fe—Cr—Ni—W film hardly dissolves into a molten salt. Therefore, the Fe—Cr—Ni—W film suppresses contact between the molten salt and the base metal surface. The Fe—Cr—Ni—W film further suppresses inward diffusion of components (Na ion and K ion, etc.) of the molten salt to the steel material side. As a result, in a molten salt of 600° C., the Fe—Cr—Ni—W film grows, and Fe diffuses outwardly to form Fe—Na oxide on the surface side of the Fe—Cr—Ni—W film. Furthermore, oxygen diffuses inwardly to form $Cr_2O_3$ on the alloy side of the Fe—Cr—Ni—W film. Thus, the molten-salt corrosion resistance of an austenitic heat resistant alloy is improved.

When the Fe content as an oxide of the Fe—Cr—Ni—W film is more than 35.0 at %, an oxide scale mainly composed of an Fe oxide is formed on the surface of the Fe—Cr—Ni—W film in the molten salt. Since the growth rate of the Fe oxide is significantly fast, and further, inward diffusion of oxygen from the molten salt cannot be suppressed, the molten-salt corrosion resistance of an austenitic heat resistant alloy deteriorates. On the other hand, when the Fe content as an oxide of the Fe—Cr—Ni—W film is less than 15.0 at %, an oxide scale mainly composed of a Cr oxide is formed in the molten salt, thus deteriorating molten-salt corrosion resistance. As a result, the molten-salt corrosion resistance of an austenitic heat resistant alloy deteriorates. Therefore, the Fe content as an oxide of the Fe—Cr—Ni—W film is 15.0 to 35.0 at %. A lower limit of the Fe content as an oxide is preferably 18.0 at %. An upper limit of the Fe content as an oxide is preferably 30.0 at %.

When the Cr content as an oxide of the Fe—Cr—Ni—W film is more than 35.0 at %, an oxide scale mainly composed of a Cr oxide is formed in a molten salt. Since the Cr oxide dissolves into the molten salt, contact between the molten salt and the base metal cannot be suppressed. As a result, the molten-salt corrosion resistance of an austenitic heat resistant alloy deteriorates. On the other hand, when the Cr content as an oxide of the Fe—Cr—Ni—W film is less than 15.0 at %, since $Cr_2O_3$, which suppresses outward diffusion of alloying elements, is not formed on the alloy side of the Fe—Cr—Ni—W film in the molten salt, the molten-salt corrosion resistance of an austenitic heat resistant alloy deteriorates. Therefore, the Cr content as an oxide of the Fe—Cr—Ni—W film is 15.0 to 35.0 at %. A lower limit of the Cr content as an oxide is preferably 18.0 at %. An upper limit of the Cr content as an oxide is preferably 30.0 at %, and more preferably 25.0 at %.

When the Ni content as an oxide of the Fe—Cr—Ni—W film is more than 45.0 at %, an oxide scale mainly composed of Ni oxide is formed on the surface of the Fe—Cr—Ni—W film in a molten salt. If Ni oxide is formed, molten-salt corrosion resistance of the Fe—Cr—Ni—W film deteriorates. Therefore, after the Ni oxide is formed, the Fe—Cr—Ni—W film becomes not able to suppress inward diffusion of the components (Na ion and K ion, etc.) of the molten salt to the steel material side. As a result, the molten-salt corrosion resistance of an austenitic heat resistant alloy deteriorates. On the other hand, when the Ni content as an oxide of the Fe—Cr—Ni—W film is less than 10.0 at %, an oxide scale mainly composed of Fe oxide is formed in the molten salt. Since the growth rate of the Fe oxide is significantly fast, and further, inward diffusion of oxygen from the molten salt cannot be suppressed, the molten-salt corrosion resistance of an austenitic heat resistant alloy deteriorates. Therefore, the Ni content as an oxide of the Fe—Cr—Ni—W film is 10.0 to 45.0 at %. A lower limit of the Ni content as an oxide is preferably 12.0 at %. An upper limit of the Ni content as an oxide is preferably 40.0 at %, more preferably 35.0 at %, and further preferably 30.0 at %.

When the W content as an oxide of the Fe—Cr—Ni—W film is more than 16.5 at %, dissolution of W from the Fe—Cr—Ni—W film violently occurs in the molten salt, and formation of $Cr_2O_3$, which suppresses outward diffusion of alloying elements, is suppressed on the alloying side of the Fe—Cr—Ni—W film. As a result, the molten-salt corrosion resistance of an austenitic heat resistant alloy deteriorates. On the other hand, when the W content as an oxide of the Fe—Cr—Ni—W film is less than 0.5 at %, the ability of the Fe—Cr—Ni—W film deteriorates in suppressing inward diffusion of components (Na ion and K ion, etc.) of a molten salt through the Fe—Cr—Ni—W film to the steel material side, and outward diffusion of Cr from the alloy. As a result, the molten-salt corrosion resistance of an austenitic heat resistant alloy deteriorates. Therefore, the W content as an oxide of the Fe—Cr—Ni—W film is 0.5 to 16.5 at %. A lower limit of the W content as an oxide is preferably 1.0 at %. An upper limit of the W content as an oxide is preferably 15.0 at %.

[Method for Measuring Composition of Fe—Cr—Ni—W Film]

The composition of the Fe—Cr—Ni—W film is measured by the following method. A test specimen including an Fe—Cr—Ni—W film is sampled from an austenitic heat resistant alloy including an Fe—Cr—Ni—W film. A depth profile by X-ray Photoelectron Spectroscopy (XPS) is created in the thickness direction of the Fe—Cr—Ni—W film for the surface of the Fe—Cr—Ni—W film. Regarding each element determined by the depth profile, state analysis is performed to separate elements (cationic ions) existing as oxides from elements (cationic ions) existing as metals. Supposing a total concentration of all cationic ions including both cationic ions existing as oxides and cationic ions existing as metals being as 100%, cationic ion fractions (at %) of Fe, Cr, Ni and W existing as oxides are calculated. The range in which the cationic ion fractions are calculated is a range from the surface of the Fe—Cr—Ni—W film to a depth position at which the detection intensity of O (oxygen) becomes a half of the detection intensity of oxygen at the surface of the Fe—Cr—Ni—W film. XPS is measured under the following conditions.

Apparatus: XPS measurement apparatus (ULVAC-PHI, Inc., Quantera SXM)

X-ray: mono-AlKα ray (hv=1486.6 eV), X ray diameter: 100 μmΦ

Neutralization gun: 1.0 V, 20 μA

Sputtering conditions: $Ar^+$, Acceleration voltage: 1 kV, Raster: 2×2 mm

Sputtering speed: 1.8 nm/min. ($SiO_2$ equivalent value).

[Thickness of Fe—Cr—Ni—W Film]

A thickness of the Fe—Cr—Ni—W film is, for example, 3.0 to 12.0 nm. If the thickness of the Fe—Cr—Ni—W film is 3.0 nm or more, since the contact between the molten salt and the alloy can be suppressed more stably, the molten-salt corrosion resistance of an austenitic heat resistant alloy is improved more stably. A lower limit of the thickness of the Fe—Cr—Ni—W film is preferably 5.0 nm. An upper limit of the thickness of the Fe—Cr—Ni—W film is preferably 10.0 nm.

[Method for Measuring Thickness of Fe—Cr—Ni—W Film]

Similarly to the above described method for measuring the composition of the Fe—Cr—Ni—W film, XPS measurement is performed on the Fe—Cr—Ni—W film surface in the thickness direction of the Fe—Cr—Ni—W film. A distance (depth) from the surface of the Fe—Cr—Ni—W film to a position at which the detected intensity of O (oxygen) becomes a half of the detected intensity of oxygen at the surface of the Fe—Cr—Ni—W film is defined as the thickness of the Fe—Cr—Ni—W film.

[Production Method]

An austenitic heat resistant alloy of the present disclosure can be produced, for example, in the following manner. A production method includes a preparation step, and an Fe—Cr—Ni—W film forming step. Hereinafter, a production method in a case of producing a seamless pipe will be described as an example. However, the production method of the present disclosure will not be limited to the case of producing a seamless pipe.

[Preparation Step]

In the preparation step, a starting material including a chemical composition of the base metal of the above described austenitic heat resistant alloy is prepared. The starting material may be a slab, a bloom, or a billet, each of which is produced by a continuous casting method (including a round continuous casting). Further, the starting material may be a billet produced by hot working an ingot which is produced by an ingot-making method. Furthermore, the starting material may be a billet produced by hot working from a slab or a bloom.

The starting material is charged into a heating furnace or a holding furnace, and is heated. The heating temperature is, for example, 1000 to 1350° C. The heated starting material is subjected to hot working. For example, the Mannesmann process is performed as the hot working. Specifically, the starting material is subjected to piercing-rolling by a piercing machine to produce a hollow shell. Subsequently, the starting material is subjected to drawing and rolling, and diameter adjusting rolling through a mandrel mill and a sizing mill to produce a seamless pipe. Hot extrusion or hot forging may be performed as the hot working. The temperature of the hot working is, for example, 500 to 1100° C.

As needed, heat treatment may be performed during the producing process, or cold working may be performed, on the starting material which has been produced by hot working. Cold working is, for example, cold rolling and cold drawing. When cold working is performed, heat treatment for controlling the structure of the starting material may be performed. Finally washing may be performed to remove foreign substances on the surface. By the above described steps, a starting material, which is a seamless pipe, is produced.

The starting material may be a steel plate. In this case, the starting material is subjected to hot working to produce a steel plate. Further, a welded steel pipe may be produced by welding a steel plate.

The starting material may be immersed in sulfuric acid after the hot working (after cold working if cold working is performed) and before the Fe—Cr—Ni—W film forming step. This allows the Fe—Cr—Ni—W film to be formed more easily.

[Fe—Cr—Ni—W Film Forming Step]

In the Fe—Cr—Ni—W film forming step, the starting material is immersed in an Fe—Cr—Ni—W film forming solution containing hydrofluoric acid and nitric acid to form an Fe—Cr—Ni—W film on the surface of the starting material.

[Fe—Cr—Ni—W Film Forming Solution]

The Fe—Cr—Ni—W film forming solution contains hydrofluoric acid, nitric acid, and a solvent. The Fe—Cr—Ni—W film forming solution has a hydrofluoric acid concentration satisfying Formula (1), and a nitric acid concentration satisfying Formula (2).

[Formula (1)]

The hydrofluoric acid concentration of the Fe—Cr—Ni—W film forming solution satisfies Formula (1):

$$35.6 \leq \text{hydrofluoric acid concentration(mass \%)} + (0.15Ni+0.85Cr+0.18Fe+0.23W) \leq 37.7 \quad (1)$$

where, each element symbol in Formula (1) is substituted by the content of each element (mass %).

Definition is made as follows: $Fn1=0.15Ni+0.85Cr+0.18Fe+0.23W$. An oxide scale of several tens of μm is formed on the surface of the starting material after hot working. For example, an oxide scale of about several μm remains even if the oxide scale is removed by shot blasting. When the hydrofluoric acid concentration of the Fe—Cr—Ni—W film forming solution does not satisfy the condition: $35.6 \leq$ hydrofluoric acid concentration(mass %)+Fn1, remaining oxide scale will not be sufficiently removed. In this case, uniform formation of the Fe—Cr—Ni—W film is impaired. On the other hand, when the hydrofluoric acid concentration of the Fe—Cr—Ni—W film forming solution does not satisfy the condition: hydrofluoric acid concentration(mass %)+Fn1≤37.7, dissolution of the starting material surface becomes significant, and grain boundary corrosion occurs, thus impairing uniform formation of the Fe—Cr—Ni—W film. Therefore, $35.6 \leq$ hydrofluoric acid concentration(mass %)+Fn1≤37.7.

[Formula (2)]

The nitrate concentration of the Fe—Cr—Ni—W film forming solution satisfies Formula (2):

$$23.5 \leq \text{nitric acid concentration(mass \%)} + (0.25Ni+0.31Cr-0.18Fe+0.24W) \leq 26.5 \quad (2)$$

where, each element symbol in Formula (2) is substituted by the content (mass %) of each element.

Definition is made as $Fn2=0.25Ni+0.31Cr-0.18Fe+0.24W$. When the nitric acid concentration of the Fe—Cr—Ni—W film forming solution does not satisfy the condition: $23.5 \leq$ nitric acid concentration(mass %)+Fn2, the Cr concentration of the Fe—Cr—Ni—W film decreases, and an Fe—Cr—Ni—W film having an appropriate chemical composition will not be formed. On the other hand, when the nitric acid concentration of the Fe—Cr—Ni—W film forming solution does not satisfy the condition: nitric acid concentration(mass %)+Fn2≤26.5, the Fe concentration of the Fe—Cr—Ni—W film decreases, an Fe—Cr—Ni—W film having an appropriate chemical composition will not be formed. Therefore, $23.5 \leq$ nitric acid concentration (mass %)+Fn2≤26.5.

The Fe—Cr—Ni—W film forming solution contains a solvent in addition to hydrofluoric acid and nitric acid. The solvent is, for example, one or two kinds selected from the group consisting of water and an organic solvent which is dispersed or dissolved in water. The Fe—Cr—Ni—W film forming solution may contain other components. The other components are, for example, one or more kinds selected from the group consisting of Fe ions, Cr ions, Ni ions. W ions, Mo ions and other ions of metal elements contained in the chemical composition of the base metal, and surfactants. Other additives may be contained in a total amount of not more than 5 mass %.

The temperature (processing temperature) of the Fe—Cr—Ni—W film forming solution and the time (processing time) for which the starting material is immersed in the Fe—Cr—Ni—W film forming solution can be appropriately set. The processing temperature is, for example, 20 to 50° C. The processing time is, for example, 30 minutes to 25 hours.

An austenitic heat resistant alloy of the present disclosure can be produced, for example, by the above described steps.

Hereinafter, although the present disclosure will be described in more specifically by way of Examples, the present disclosure will not be limited to these Examples.

EXAMPLES

Austenitic heat resistant alloys having various chemical compositions of base metal, and compositions of film were produced to investigate molten-salt corrosion resistance in a molten salt.

[Investigation Method]

Starting materials of Alloy Nos. 1 to 16 having the chemical compositions shown in Table 1 were melted to produce ingots. Referring to Table 1, the alloys of Alloy Nos. 1 to 10 were within the range of the chemical composition of the base metal of the austenitic heat resistant alloy of the present disclosure. On the other hand, the alloys of Alloy Nos. 11 to 16 were outside of the range of the chemical composition of the base metal of the austenitic heat resistant alloy of the present disclosure. The alloy of Alloy No. 15 had a chemical composition corresponding to the known SUS347H. The alloy of Alloy No. 16 had a chemical composition corresponding to known Alloy 625.

sampled from the alloy plate of each test number. A depth profile by XPS was created in the thickness direction of the film for the surface of the film. Regarding each element determined by the depth profile, state analysis was performed to separate elements (cationic ions) existing as oxides from elements (cationic ions) existing as metals. Supposing that a total concentration of all cationic ions including both cationic ions existing as oxides and cationic ions existing as metals be 100%, cationic ion fractions (at %) of Fe, Cr, Ni and W existing as oxides were calculated. The range in which the cationic ion fractions were calculated was a range from the surface of the film to a depth position at which the detection intensity of O (oxygen) became a half of

TABLE 1

| Alloy No. | Chemical composition (mass %, the balance: Fe and impurities) | | | | | | | | | | | | | | | |
|---|---|---|---|---|---|---|---|---|---|---|---|---|---|---|---|---|
| | C | Si | Mn | P | S | Cr | Ni | W | Ti | Nb | sol. Al | B | N | O | Mo | Others |
| 1 | 0.080 | 0.23 | 1.07 | 0.011 | 0.006 | 22.5 | 40.6 | 10.0 | 0.02 | 0.02 | 0.002 | 0.0096 | 0.018 | 0.0023 | 0.19 | — |
| 2 | 0.062 | 0.57 | 0.36 | 0.024 | 0.002 | 25.1 | 41.4 | 7.6 | 0.13 | 0.30 | 0.019 | 0.0027 | 0.007 | 0.0025 | 0.32 | — |
| 3 | 0.076 | 0.11 | 0.52 | 0.005 | 0.002 | 23.5 | 44.2 | 6.8 | 0.11 | 0.25 | 0.010 | 0.0033 | 0.016 | 0.0017 | 0.09 | — |
| 4 | 0.101 | 0.75 | 1.42 | 0.003 | 0.003 | 24.7 | 43.2 | 8.8 | 0.03 | 0.06 | 0.009 | 0.0044 | 0.009 | 0.0034 | 0.17 | — |
| 5 | 0.078 | 0.32 | 1.03 | 0.001 | 0.001 | 24.9 | 39.1 | 7.9 | 0.09 | 0.38 | 0.016 | 0.0038 | 0.009 | 0.0036 | 0.31 | Nd: 0.07, Ce: 0.07 |
| 6 | 0.089 | 0.20 | 0.58 | 0.003 | 0.003 | 25.0 | 42.1 | 7.2 | 0.09 | 0.37 | 0.013 | 0.0063 | 0.015 | 0.0022 | 0.16 | Y: 0.05 |
| 7 | 0.075 | 0.15 | 1.45 | 0.021 | 0.005 | 23.5 | 45.6 | 7.9 | 0.01 | 0.22 | 0.015 | 0.0021 | 0.015 | 0.0034 | 0.01 | Zr: 0.06 |
| 8 | 0.068 | 0.31 | 1.51 | 0.010 | 0.004 | 23.4 | 45.1 | 8.0 | 0.05 | 0.23 | 0.012 | 0.0050 | 0.013 | 0.0035 | 0.05 | Ca: 0.01 |
| 9 | 0.074 | 0.21 | 1.02 | 0.009 | 0.006 | 22.5 | 47.1 | 7.1 | 0.06 | 0.41 | 0.011 | 0.0022 | 0.018 | 0.0026 | 0.11 | Hf: 0 |
| 10 | 0.098 | 0.12 | 1.10 | 0.008 | 0.006 | 20.5 | 48.3 | 6.9 | 0.07 | 0.45 | 0.021 | 0.0031 | 0.019 | 0.0041 | 0.12 | Pd: 0.01 |
| 11 | 0.088 | 0.11 | 1.32 | 0.008 | 0.005 | 30.1 | 44.2 | 6.7 | 0.05 | 0.15 | 0.015 | 0.0035 | 0.018 | 0.0038 | 0.21 | — |
| 12 | 0.087 | 0.13 | 1.51 | 0.006 | 0.001 | 18.2 | 43.2 | 7.2 | 0.01 | 0.16 | 0.013 | 0.0019 | 0.019 | 0.0023 | 0.30 | — |
| 13 | 0.091 | 0.15 | 1.48 | 0.005 | 0.002 | 23.5 | 54.1 | 8.2 | 0.03 | 0.21 | 0.015 | 0.0018 | 0.012 | 0.0025 | 0.15 | — |
| 14 | 0.093 | 0.14 | 1.46 | 0.004 | 0.002 | 23.6 | 9.5 | 9.1 | 0.07 | 0.22 | 0.015 | 0.0016 | 0.016 | 0.0017 | 0.16 | — |
| 15 | 0.067 | 0.37 | 1.20 | 0.002 | 0.002 | 17.9 | 12.8 | — | — | 0.67 | 0.022 | — | 0.058 | 0.0042 | 0.20 | — |
| 16 | 0.091 | 0.11 | 0.46 | 0.009 | 0.003 | 21.6 | 62.5 | — | 0.19 | 3.30 | 0.012 | — | 0.015 | 0.0018 | 8.70 | Co: 0.13 |

[Preparation Step]

The resulting ingot was heated to 1220° C., was formed into a plate material by hot forging, and thereafter was cooled to the room temperature. After cooling, the resulting plate material was formed into a plate material having a thickness of 20 mm by cutting the outer surface. The resulting plate material was then subjected to rolling at room temperature to be formed into a plate material having a thickness of 14 mm. Then, the resulting plate material was heated to 1200° C. and held for 15 minutes, and thereafter was cooled with water to produce a starting material.

[Fe—Cr—Ni—W Film/Film Forming Step]

Table 2 shows alloy numbers and conditions of the film forming solution of each test number. The alloy plate of each test number was immersed in a film forming solution (containing 5.5 g/L of Fe ions) of 30° C. In Test Nos. 1 to 14 and Test Nos. 24 to 29, Fe—Cr—Ni—W film forming solutions having hydrofluoric acid concentrations and nitric acid concentrations shown in Table 2 were used, and the processing time was 2 hours. In Test Nos. 15 to 23, processing solutions having hydrofluoric acid concentrations and nitric acid concentrations, which did not satisfy Formula (1) and/or Formula (2), were used, and the processing time was 30 minutes. Through the above described steps, austenitic heat resistant alloys were produced.

The composition of the film of the alloy plate of each test number was analyzed, and a corrosion test in a molten salt was conducted.

[Composition Analysis of Film]

The composition of the film formed on the surface of the base metal of the alloy plate of each test number was measured by the following method. A test specimen including a film formed on the surface of the alloy plate was the detection intensity of oxygen at the surface of the film. XPS was measured under the following conditions.

Apparatus: XPS measurement apparatus (ULVAC-PHI, Inc., Quantera SXM)

X-ray: mono-AlKα ray (hv=1486.6 eV), X ray diameter: 100 μmΦ

Neutralization gun: 1.0 V, 20 ρA

Sputtering conditions: Ar$^+$, Acceleration voltage: 1 kV, Raster: 2×2 mm

Sputtering speed: 1.8 nm/min. (SiO$_2$ equivalent value).

[Film Thickness Measurement Test]

Similarly to the above described composition analysis of film. XPS measurement was performed on the surface of the alloy plate of each test number in the thickness direction of the film. A depth position (half value width) at which a detection intensity of O (oxygen) was a half of the detection intensity of oxygen at the surface of the film was defined as the thickness of the film. The results are shown in Table 2.

[Molten Salt Corrosion Test]

Molten-salt corrosion resistance in a molten salt of the alloy plate of each test number was evaluated by the following test. A test specimen of a thickness of 1.5 mm×a width of 15 mm×a length of 25 mm was cut out from the alloy plate of each test number after the formation of the film. After being polished on one test specimen surface with waterproof abrasive paper, the test specimen was degreased and dried to be used in the test. The molten salt was prepared by mixing NaNO$_3$ and KNO$_3$ at a weight ratio of 60:40 and heating the mixture to 600° C. The test specimen was immersed in the molten salt at a test temperature of 600° C. The test time was 3000 hours. The oxide scale formed on the surface was removed after the test. A corrosion weight loss (mg/cm) was calculated from the difference between the weight of the alloy plate before the test, and the weight of the alloy plate after the test. The results are shown in Table 2.

fluoric acid concentration of the processing solution was too low, thus not satisfying Formula (1). For that reason, the composition of the film formed on the surface of the base

TABLE 2

| | | Conditions of Fe—Cr—Ni—W film forming solution | | Fe—Cr—Ni—W film | | | | | Test results |
|---|---|---|---|---|---|---|---|---|---|
| | | | | Composition | | | | | |
| Test No. | Alloy No. | HF (mass %) + Fn1 | $HNO_3$ (mass %) + Fn2 | Fe concentration (at %) | Cr concentration (at %) | Ni concentration (at %) | W concentration (at %) | Thickness (nm) | Corrosion weight loss ($mg/cm^2$) |
| 1 | 1 | 37.2 | 24.7 | 33.5 | 18.9 | 13.6 | 13.4 | 10.4 | 4.7 |
| 2 | 2 | 37.2 | 24.7 | 29.7 | 27.4 | 22.8 | 10.2 | 9.9 | 3.5 |
| 3 | 3 | 37.1 | 24.7 | 30.5 | 23.0 | 25.3 | 9.1 | 10.0 | 3.9 |
| 4 | 4 | 37.1 | 24.7 | 18.9 | 24.6 | 24.7 | 11.9 | 8.5 | 4.1 |
| 5 | 5 | 37.1 | 24.6 | 34.6 | 25.6 | 12.6 | 15.2 | 10.6 | 4.3 |
| 6 | 6 | 37.2 | 24.8 | 31.2 | 27.1 | 18.7 | 9.7 | 9.9 | 3.7 |
| 7 | 6 | 37.0 | 25.5 | 17.3 | 31.2 | 25.7 | 5.5 | 4.8 | 4.2 |
| 8 | 3 | 36.6 | 24.3 | 29.0 | 24.2 | 24.0 | 9.1 | 10.0 | 4.0 |
| 9 | 3 | 36.1 | 24.5 | 30.8 | 25.3 | 22.8 | 9.1 | 10.0 | 3.8 |
| 10 | 7 | 37.1 | 24.7 | 28.2 | 23.1 | 25.1 | 10.6 | 8.6 | 3.5 |
| 11 | 8 | 37.1 | 24.6 | 28.6 | 22.9 | 25.2 | 10.8 | 8.7 | 4.3 |
| 12 | 9 | 37.0 | 24.5 | 28.9 | 19.5 | 31.2 | 9.6 | 8.8 | 3.3 |
| 13 | 10 | 36.9 | 24.3 | 29.8 | 22.1 | 32.4 | 9.3 | 9.1 | 3.7 |
| 14 | 10 | 35.7 | 26.1 | 23.5 | 28.0 | 43.6 | 2.7 | 7.2 | 4.1 |
| 15 | 3 | 35.1 | 30.7 | 6.1 | 46.0 | 5.1 | 9.1 | 7.0 | 11.7 |
| 16 | 4 | 35.1 | 30.7 | 5.7 | 49.2 | 7.4 | 11.9 | 5.9 | 16.4 |
| 17 | 6 | 35.2 | 30.8 | 9.4 | 54.2 | 5.6 | 9.7 | 6.9 | 16.0 |
| 18 | 6 | 40.2 | 24.8 | 75.2 | 20.1 | 1.8 | 2.8 | 2.5 | 15.4 |
| 19 | 6 | 35.2 | 24.8 | 65.2 | 15.1 | 6.5 | 0.5 | 2.8 | 15.3 |
| 20 | 6 | 37.2 | 29.8 | 6.1 | 40.1 | 8.5 | 2.8 | 9.9 | 13.6 |
| 21 | 6 | 37.2 | 23.3 | 55.3 | 21.1 | 19.8 | 0.6 | 2.1 | 14.2 |
| 22 | 1 | 34.7 | 22.7 | 23.5 | 18.9 | 13.6 | 25.3 | 7.5 | 14.5 |
| 23 | 3 | 36.1 | 30.7 | 30.5 | 29.8 | 26.4 | 0.1 | 7.2 | 11.8 |
| 24 | 11 | 37.4 | 25.2 | 9.2 | 57.5 | 5.1 | 2.6 | 7.0 | 14.6 |
| 25 | 12 | 36.7 | 24.0 | 76.3 | 16.1 | 1.3 | 2.8 | 12.0 | 12.1 |
| 26 | 13 | 37.2 | 24.8 | 9.2 | 34.5 | 17.7 | 3.2 | 4.9 | 15.6 |
| 27 | 14 | 36.8 | 24.0 | 82.4 | 16.1 | 1.0 | 3.5 | 22.8 | 13.2 |
| 28 | 15 | 35.8 | 22.7 | 81.5 | 15.2 | 2.8 | 0.0 | 19.2 | 10.9 |
| 29 | 16 | 34.8 | 22.5 | 17.5 | 38.9 | 15.6 | 0.0 | 7.0 | 15.9 |

[Test Results]

The test results are shown in Table 2. The chemical composition of the base metal of each alloy plate of Test Nos. 1 to 14 was appropriate. The alloy plates of Test Nos. 1 to 14 further included an Fe—Cr—Ni—W film having an appropriate composition on the surface of the base metal. For that reason, the corrosion weight loss of each alloy plate of Test Nos. 1 to 14 was not more than 10.0 $mg/cm^2$, thus exhibiting excellent molten-salt corrosion resistance.

On the other hand, in the steel plates of Test Nos. 15 to 17 and 22, although the chemical composition of the base metal was appropriate, the hydrofluoric acid concentration and nitric acid concentration of the processing solution did not satisfy Formulae (1) and (2). For that reason, the composition of the film formed on the surface of the base metal was not appropriate. As a result, the corrosion weight loss of each steel plate of Test Nos. 15 to 17, and 22 was more than 10.0 $mg/cm^2$, thus not exhibiting excellent molten-salt corrosion resistance.

In the steel plate of Test No. 18, although the chemical composition of the base metal was appropriate, the hydrofluoric acid concentration of the processing solution was too high, thus not satisfying Formula (1). For that reason, the composition of the film formed on the surface of the base metal was not appropriate. As a result, the corrosion weight loss of the steel plate of Test No. 18 was 15.4 $mg/cm^2$, thus not exhibiting excellent molten-salt corrosion resistance.

In the steel plate of Test No. 19, although the chemical composition of the base metal was appropriate, the hydrometal was not appropriate. As a result, the corrosion weight loss of the steel plate of Test No. 19 was 15.3 $mg/cm^2$, thus not exhibiting excellent molten-salt corrosion resistance.

In the steel plates of Test Nos. 20 and 23, although the chemical composition of the base metal was appropriate, the nitric acid concentration of the processing solution was too high, thus not satisfying Formula (2). For that reason, the composition of film formed on the surface of the base metal was not appropriate. As a result, the corrosion weight losses of the steel plates of Test Nos. 20 and 23 were 13.6 $mg/cm^2$ and 11.8 $mg/cm^2$ respectively, thus not exhibiting excellent molten-salt corrosion resistance.

In the steel plate of Test No. 21, although the chemical composition of the base metal was appropriate, the nitrate concentration in the processing solution was too low, thus not satisfying Formula (2). For that reason, the composition of the film formed on the surface of the base metal was not appropriate. As a result, the corrosion weight loss of the steel plate of Test No. 21 was 14.2 $mg/cm^2$, thus not exhibiting excellent molten-salt corrosion resistance.

In the steel plate of Test No. 24, the Cr content of the base metal was too high. For that reason, the composition of the film formed on the surface of the base metal was not appropriate. As a result, the corrosion weight loss of the steel plate of Test No. 24 was 14.6 $mg/cm^2$, thus not exhibiting excellent molten-salt corrosion resistance.

In the steel plate of Test No. 25, the Cr content of the base metal was too low. For that reason, the composition of the film formed on the surface of the base metal was not appropriate. As a result, the corrosion weight loss of steel plate of Test No. 25 was 12.1 mg/cm², thus not exhibiting excellent molten-salt corrosion resistance.

In the steel plate of Test No. 26, the Ni content of the base metal was too high. For that reason, the composition of the film formed on the surface of the base metal was not appropriate. As a result, the corrosion weight loss of the steel plate of Test No. 26 was 15.6 mg/cm², thus not exhibiting excellent molten-salt corrosion resistance.

In the steel plate of Test No. 27, the Ni content of the base metal was too low. For that reason, the composition of the film formed on the surface of the base metal was not appropriate. As a result, the corrosion weight loss of the steel plate of Test No. 27 was 13.2 mg/cm², thus not exhibiting excellent molten-salt corrosion resistance.

In the steel plate of Test No. 28, the chemical composition of the base metal was the chemical composition corresponding to the known SUS347H, and was not appropriate. As a result, the corrosion weight loss of the steel plate of Test No. 28 was 10.9 mg/cm², thus not exhibiting excellent molten-salt corrosion resistance.

In the steel plate of Test No. 29, the chemical composition of the base metal was the chemical composition corresponding to the known Alloy 625, and was not appropriate. As a result, the corrosion weight loss of the steel plate of Test No. 29 was 15.9 mg/cm², thus not exhibiting excellent molten-salt corrosion resistance.

So far, the embodiment of the present disclosure has been described. However, the above described embodiment is merely exemplification for carrying out the present disclosure. Accordingly, the present disclosure will not be limited to the above described embodiment, and can be carried out by appropriately modifying the above-described embodiment within a range that does not deviate from the gist of the present invention.

The invention claimed is:

1. An austenitic heat resistant alloy, comprising:
a base metal having a chemical composition consisting of: in mass %,
C: 0.030 to 0.120%,
Si: 0.02 to 1.00%,
Mn: 0.10 to 2.00%,
Cr: 20.0% or more to less than 28.0%,
Ni: more than 35.0% to 50.0% or less,
W: 4.0 to 10.0%,
Ti: 0.01 to 0.30%,
Nb: 0.01 to 1.00%,
sol. Al: 0.0005 to 0.0400%,
B: 0.0005 to 0.0100%,
Zr: 0 to 0.1000%,
Ca: 0 to 0.0500%,
REM: 0 to 0.2000%,
Hf: 0 to 0.2000%,
Pd: 0 to 0.2000%,
P: 0.040% or less,
S: 0.010% or less,
N: less than 0.020%,
O: 0.0050% or less,
Mo: less than 0.5%,
Co: 0 to 0.80%, and
Cu: 0 to 0.50%,
with the balance being Fe and impurities; and
an Fe—Cr—Ni—W film on a surface of the base metal, the Fe—Cr—Ni—W film containing, as oxides, Fe: 15.0 to 35.0 at %, Cr: 15.0 to 35.0 at %, Ni: 10.0 to 45.0 at %, and W: 0.5 to 16.5 at %.

2. The austenitic heat resistant alloy according to claim 1, wherein
the chemical composition of the base metal contains, in mass %, Zr: 0.0005 to 0.1000%.

3. The austenitic heat resistant alloy according to claim 1, wherein
the chemical composition of the base metal contains, in mass %, Ca: 0.0005 to 0.0500%.

4. The austenitic heat resistant alloy according to claim 2, wherein
the chemical composition of the base metal contains, in mass %, Ca: 0.0005 to 0.0500%.

5. The austenitic heat resistant alloy according to claim 1, wherein
the chemical composition of the base metal contains at least one kind selected from the group consisting of, in mass %, REM: 0.0005 to 0.2000%, Hf: 0.0005 to 0.2000%, and Pd: 0.0005 to 0.2000%.

6. The austenitic heat resistant alloy according to claim 2, wherein
the chemical composition of the base metal contains at least one kind selected from the group consisting of, in mass %, REM: 0.0005 to 0.2000%, Hf: 0.0005 to 0.2000%, and Pd: 0.0005 to 0.2000%.

7. The austenitic heat resistant alloy according to claim 3, wherein
the chemical composition of the base metal contains at least one kind selected from the group consisting of, in mass %, REM: 0.0005 to 0.2000%, Hf: 0.0005 to 0.2000%, and Pd: 0.0005 to 0.2000%.

8. The austenitic heat resistant alloy according to claim 4, wherein
the chemical composition of the base metal contains at least one kind selected from the group consisting of, in mass %, REM: 0.0005 to 0.2000%, Hf: 0.0005 to 0.2000%, and Pd: 0.0005 to 0.2000%.

9. A method for producing an austenitic heat resistant alloy, comprising the steps of:
preparing a starting material having the chemical composition according to claim 1; and
forming an Fe—Cr—Ni—W film on a surface of the starting material by immersing the starting material in a solution which has a hydrofluoric acid concentration satisfying Formula (1) and a nitric acid concentration satisfying Formula (2):

$$35.6 \leq \text{hydrofluoric acid concentration(mass \%)} + (0.15\text{Ni} + 0.85\text{Cr} + 0.18\text{Fe} + 0.23\text{W}) \leq 37.7 \quad (1), \text{and}$$

$$23.5 \leq \text{nitric acid concentration(mass \%)} + (0.25\text{Ni} + 0.31\text{Cr} - 0.18\text{Fe} + 0.24\text{W}) \leq 26.5 \quad (2),$$

where each element symbol in Formulae (1) and (2) is substituted by the content (mass %) of each element.

* * * * *